United States Patent [19]

Vellani

[11] 4,017,244

[45] Apr. 12, 1977

[54] DEVICE FOR THE MOLDING OF CORRUGATED PIPE FROM EXTRUDED THERMOPLASTIC MATERIALS

[76] Inventor: Andrea Giuliano Vellani, 3 Hanson Way, Coram, N.Y. 11727

[22] Filed: Apr. 15, 1975

[21] Appl. No.: 568,241

[52] U.S. Cl. ............................ 425/326 R; 425/369;
425/387 R; 425/392; 425/412; 425/DIG. 54;
264/94; 264/95

[51] Int. Cl.² ........................................ B29D 23/04

[58] Field of Search .......... 425/387, 392, 435, 436,
425/391, 324, 325, 326 R, 369, 388, 393,
403, 404, 253, 396, 436 R, DIG. 54; 249/59;
264/210, 194, 195, 95, 94, 209, 286, 285,
287, 288, 113; 72/58, 59, 61, 62

[56] References Cited

UNITED STATES PATENTS

| | | | |
|---|---|---|---|
| 2,708,277 | 5/1955 | Holt | 10/89 R |
| 3,222,728 | 12/1965 | Roberts et al. | 264/94 |
| 3,346,921 | 10/1967 | Bunish et al. | 425/113 |
| 3,558,753 | 1/1971 | Edlin | 264/95 |
| 3,844,700 | 10/1974 | Sokolow | 425/393 |

*Primary Examiner*—Robert L. Spicer, Jr.
*Attorney, Agent, or Firm*—Richard L. Miller

[57] ABSTRACT

The present invention relates to a device for shaping and cooling a smooth thin wall pipe, obtained from extrusion of a thermoplastic material, into a corrugated pipe shape.

The most common technology to produce plastic corrugated pipe uses a series of split molds carried by two continuous chains, the split molds locking around an extruded smooth pipe which by means of a slight positive pressure is forced against the inside walls of the molds (which travel at extrusion speed) therefore shaping the hot plastic pipe into a corrugated shape. At the same time excessive heat is dissipated by a forced flow of air passing over the outside surface of the molds. This system requires a great number of molds and therefore machines of great encumberance.

4 Claims, 2 Drawing Figures

DEVICE FOR THE MOLDING OF CORRUGATED PIPE FROM EXTRUDED THERMOPLASTIC MATERIALS

It is the object of this invention to provide a system requiring only one mold and insuring at the same time the cooling of the thermoplastic material; also the dimensions of the complete machine is greatly reduced.

According to the invention the device comprises a hollow steel tube whose inside surface is machined so to obtain a spiral groove (practically an internal thread) and rotating around its longitudinal axis inside a stationary box where a cooling fluid is circulated.

The smooth surface thermoplastic tube produced by a standard extruder is introduced, while hot and therefore easily moldable, into the single piece rotating mold and by means of a positive air pressure forced to follow the contours of the mold.

The tube coming from the extruder has a motion along its longitudinal axis, therefore in order to allow the pipe inside the mold to further advance in the same direction the mold itself is rotated at such a speed to allow the helical corrugation of the tube, now molded, to slide out of the mold.

The mold is rotated at such speed that any point of the helicoidal groove has a speed component equal in magnitude and direction to the speed of any point of the smooth tube produced by the extruder.

The embodiment of the inventive device will now be described by way of example only and without implying any limitation, since the construction details, in any case based on the basic concept of the invention, may be varied without departing from the scope thereof.

For the disclosure reference is had to the accompanying drawing, wherein.

Figure 1:
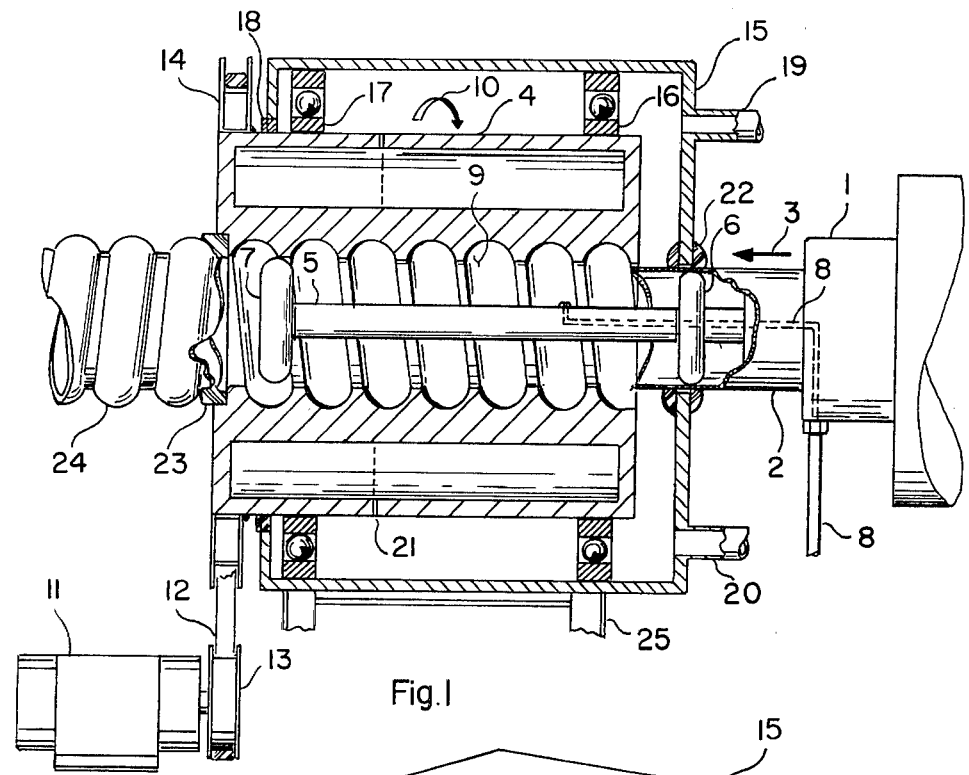
FIG. 1 is a diagrammatical longitudinal cross view of the embodiment of the invention.
Figure 2:
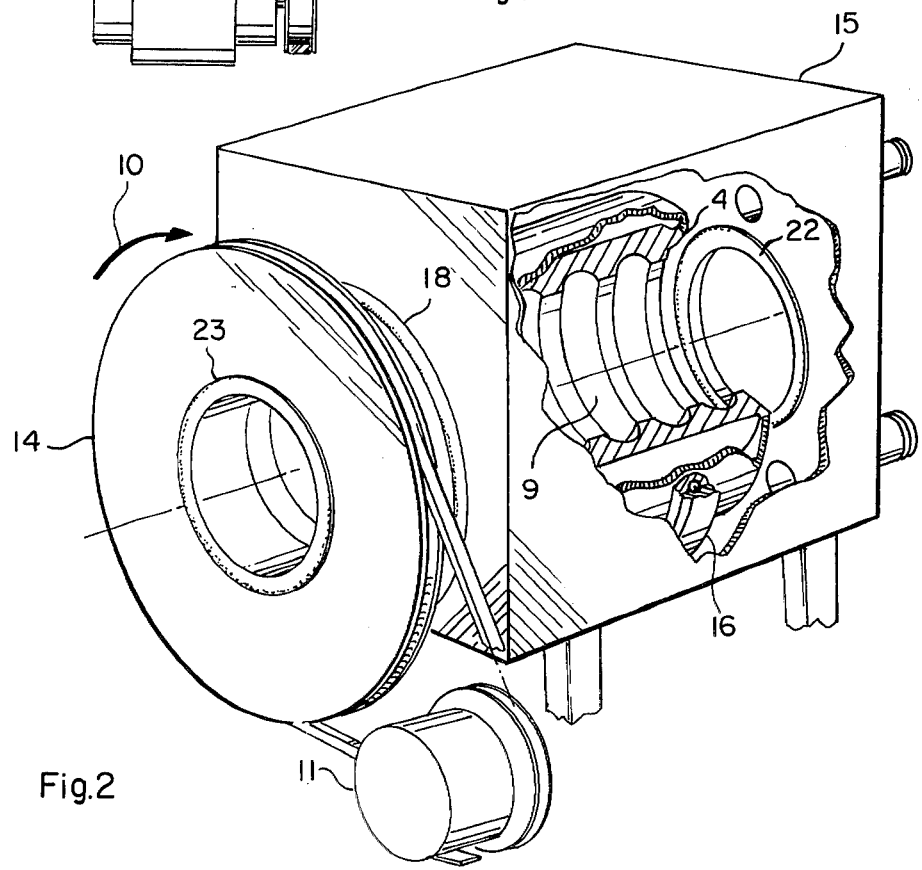
FIG. 2 is a perspective view of same, showing the same components with the exclusion of extruder's die, mandrel and thermoplastic pipe.

In FIG. 1 is shown the extruder die 1 producing thermoplastic extrudate of hollow circular crossection 2 with smooth, thin walls and moving in the direction indicated by arrow 3. The extrudate 2 is drawn into the mold 4 (by human operator); die 1 also carries a mandrel 5 complete with plugs 6 and 7 of such diameter and shape to contain a positive air pressure inside pipe 2, such air being conveyed from an outside source (not shown) thru tube 8 part of which is located inside mandrel 5.

The positive air pressure forces the soft extrudate 2 against the inside wall of mold 4 and its helical groove 9. Mold 4 is rotated in the direction shown by arrow 10 by electrical motor 11 by means of belt 12 and pulleys 13 and 14.

Mold 4 is cylindrical and double walled, held inside stationary outer body 15 by means of ballbearings 16 and 17; the way ballbearings 16 and 17 are connected to outer body 15 is not illustrated, being outside the scope of this description.

To provide cooling for the extrudate a fluid is introduced inside outer body 15 thru opening 19 and extracted thru opening 20. The cooling fluid can be water but a silicon oil with a high boiling point would be better suitable.

The fluid is to be circulated by a pump(not shown) thru a closed loop circuit (not shown), of any commercial type. Mold 4 is also double walled so the fluid can circulated inside it thru a row of holes 21. Seals 18, 22 and 23 are provided at the points where the extrudate enters the outer body 15, at the exit from outerbody and between mold 4 and outer body 15.

The extrudate 2 moves in the direction of arrow 3 while the mold 4 rotates in the direction of arrow 10; direction of rotation is dictated by the left or right hand rotation of helical groove 9.

Helical groove 9 can be of a shape such as square screw thread or thread of any othershape as long as sharp edges and corners are avoided.

Corrugated pipe 24 is formed inside the mold, therefore in order to allow the corrugated pipe to maintain the same speed as smooth pipe 2 entering the same mold, the mold has to rotate at a speed that allows a continuous movement of the extrudate from the extruder to the mold, during the molding phase transitioning from smooth to corrugated shape and at the exit from the mold. For this reason groove 9 inside mold 4 is helicoidal; the resulting corrugated pipe has a corrugation also helicoidal, therefore corrugated pipe moving along its longitudinal axis and mold rotating around it interact in the same way as a screw inside a screwjack does.

Ratio of extrusion speed to rotational speed must be finely regulated manually or automatically by means of any available commercial system (not shown).

The stationary outer body 15 is supported by legs 25.

I claim:

1. A device for the molding of corrugated pipe from extruded thermoplastic materials comprising: a stationary frame having a first end mounted adjacent to the exit of an extruding machine and a second end downstream from said first end; a rotatable mold in said stationary frame having a first end adjacent to and aligned with said first end of said stationary frame, and a second end downstream of said first end through which a corrugated pipe exits; means mounting said mold for rotatable movement in said stationary frame; means for rotatably driving said mold about its longitudinal axis, said mold comprising a central passage forming an inner wall of said mold, said inner wall having a spiral groove formed along the length thereof, said stationary frame having means for cooling said mold and the extrudate, and means for supplying air pressure to the interior of the extrudate when passing through said central passage, said means for supplying air pressure comprising a source of pressurized air, and passage means connecting said source of pressurized air to the interior of said central passage, wherein said means for supplying pressurized air further comprises a mandrel mounted in said central passage having a first plug mounted at one end thereof, and a second plug mounted at the other end thereof, said first plug positioned within said first end of said stationary frame, and said second plug spaced downstream from said first plug and positioned within said central passage, said mandrel having a passageway in the center thereof forming part of said passage means of said means for supplying air pressure, whereby when pressurized air is directed to the interior of said central passage the extrudate is forced outwardly into contact with said spiral groove of said inner wall, wherein each of said first end and said second end of said stationary frame has an opening formed therein for the passage of extrudate therethrough each opening having a seal therearound for preventing the flow of air therethrough.

2. The device according to Claim 1, wherein said means for cooling comprises an inlet passage for the passage of coolant therein, said inlet passage leading to the interior of said stationary frame, an outlet passage leading the coolant from the interior of said stationary frame, and a plurality of holes formed on the circumference of said mold for the passage of the coolant therethrough, said mold having a circumferential channel therein cooperating with said plurality of holes for the flow of the coolant therein to thereby cool the extrudate.

3. The device according to claim 1, wherein said means for rotatably driving said mold comprises an electric motor, and transmission means connecting the circumference of said mold with the driven shaft of said electric motor.

4. The device according to claim 1, wherein said means mounting said mold for rotatable movement comprises a pair of ball bearings spaced apart along the circumference of said mold and positioned between said circumference of said mold and said stationary frame.

* * * * *